(12) United States Patent
Veneman et al.

(10) Patent No.: US 10,219,534 B2
(45) Date of Patent: Mar. 5, 2019

(54) METHOD FOR THE PREPARATION OF A LIQUID ENTERAL NUTRITIONAL COMPOSITION COMPRISING MICELLAR CASEIN

(71) Applicant: N.V. Nutricia, Zoetermeer (NL)

(72) Inventors: Jan Michel Veneman, Utrecht (NL); Hilde Ruis, Utrecht (NL); Suzanne Van Steenis, Wageningen (NL)

(73) Assignee: N.V. NUTRICIA, Zoetermeer (NL)

( * ) Notice: Subject to any disclaimer, the term of this patent is extended or adjusted under 35 U.S.C. 154(b) by 313 days.

(21) Appl. No.: 14/758,136

(22) PCT Filed: Dec. 24, 2013

(86) PCT No.: PCT/NL2013/050957
§ 371 (c)(1),
(2) Date: Jun. 26, 2015

(87) PCT Pub. No.: WO2014/104890
PCT Pub. Date: Jul. 3, 2014

(65) Prior Publication Data
US 2015/0351437 A1    Dec. 10, 2015

(30) Foreign Application Priority Data

Dec. 28, 2012  (WO) ................ PCT/NL2012/050935

(51) Int. Cl.
| | |
|---|---|
| *A23L 2/52* | (2006.01) |
| *A23L 5/00* | (2016.01) |
| *A23L 29/30* | (2016.01) |
| *A23L 33/00* | (2016.01) |
| *A23L 33/19* | (2016.01) |
| *A23L 33/125* | (2016.01) |

(52) U.S. Cl.
CPC .............. *A23L 33/125* (2016.08); *A23L 2/52* (2013.01); *A23L 5/00* (2016.08); *A23L 29/30* (2016.08); *A23L 33/19* (2016.08); *A23L 33/40* (2016.08); *A23V 2002/00* (2013.01)

(58) Field of Classification Search
None
See application file for complete search history.

(56) References Cited

U.S. PATENT DOCUMENTS

| | | | |
|---|---|---|---|
| 4,994,442 A | 2/1991 | Gil et al. | |
| 5,171,603 A * | 12/1992 | Singer | A23C 9/1307 426/572 |
| 5,173,322 A | 12/1992 | Melachouris et al. | |
| 5,290,582 A | 3/1994 | Dressel et al. | |
| 5,292,723 A * | 3/1994 | Audry | A61K 38/00 424/439 |
| 5,683,984 A | 11/1997 | Jost | |
| 5,904,948 A * | 5/1999 | Sartorio | A23F 5/38 426/453 |
| 6,426,110 B1 * | 7/2002 | Basa | A23C 11/06 426/588 |
| 2009/0162485 A1 * | 6/2009 | Schmitt | A23C 21/00 426/72 |
| 2011/0038982 A1 * | 2/2011 | Sliwinski | A23L 33/40 426/2 |
| 2012/0142587 A1 | 6/2012 | Minor et al. | |

FOREIGN PATENT DOCUMENTS

| | | |
|---|---|---|
| EP | 1 386 545 A1 | 2/2004 |
| EP | 1 623 629 A1 | 2/2006 |
| EP | 2 363 028 | 9/2011 |
| WO | WO-80/02226 A1 | 10/1980 |
| WO | WO-95/22909 A1 | 8/1995 |
| WO | WO-98/21953 A1 | 5/1998 |
| WO | WO-02/098242 A1 | 12/2002 |
| WO | WO-2004/017742 A1 | 3/2004 |
| WO | WO-2008/005032 A1 | 1/2008 |
| WO | WO-2008/041219 A1 | 4/2008 |
| WO | WO-2008/131061 A1 | 10/2008 |
| WO | WO-2009/072884 A1 | 6/2009 |
| WO | WO-2009/072886 A1 | 6/2009 |

OTHER PUBLICATIONS

International Search Report of PCT/NL2013/050957 dated Feb. 17, 2014.
International Preliminary Report on Patentability in PCT/NL2013/050957 completed Mar. 25, 2015.
"Dried skimmed milk", 2008, 1 page.
"Milchpulver (Milk powder)", Wikipedia, accessed Jun. 3, 2017 from Internet URL: https://de.wikipedia.org/wiki/Milchpulver, with English translation, 8 pages.
Cullen et al., "Chapter 1, Mixing in the food industry: trends and challenges"; Muthukumarappan, "Chapter 2, Mixing fundamentals"; Fitzpatrick "Chapter 13, Particulate and powder mixing", Food Mixing: Principles and Applications edited by P.J. Cullen, 2009, 37 pages.
Cytosport, "Chocolate Protein Dietary Supplement", Jun. 2008, 2 pages.
Gaiani et al., "Use of a turbidity sensor to characterize micelluar casein powder rehydration: influence of some technological effects", J. Dairy Sci., 2005, vol. 88, pp. 2700-2706.
Granger et al., "Mapping of ice cream formulation using front-face fluorescence spectroscopy", International Dairy Journal, 2006, vol. 16, pp. 489-496.
P.J. Fellows, "Food processing technology—principles and practice, third edition", 2009, 35 pages.

* cited by examiner

*Primary Examiner* — Tamra L. Dicus
(74) *Attorney, Agent, or Firm* — Gilberto M. Villacorta; Sunit Talapatra; Foley & Lardner LLP

(57) ABSTRACT

The invention relates to a method for preparing a shelf-stable liquid enteral composition for providing nutrition, either as a supplement, or as a complete nutrition, comprising a high amount of micellar casein, comprising dissolving a dry blend of micellar casein and digestible carbohydrate.

17 Claims, No Drawings

METHOD FOR THE PREPARATION OF A LIQUID ENTERAL NUTRITIONAL COMPOSITION COMPRISING MICELLAR CASEIN

CROSS REFERENCE TO RELATED APPLICATIONS

The present application is a National Stage of International Application No. PCT/NL2013/050957 filed on Dec. 24, 2013, which was published on Jul. 3, 2014, as WO 2014/104890 A1, and which claims the benefit of International Application No. PCT/NL2012/050935, filed Dec. 28, 2012, the entire disclosures of which are incorporated herein by reference.

FIELD OF THE INVENTION

The present invention is in the field of liquid enteral nutritional compositions, a method for producing the same and intermediate aqueous products suitable for use in the method of the invention.

BACKGROUND OF THE INVENTION

Some patients need nutrition, either as a supplement, or as a complete nutrition, in the smallest volume of liquid. Special care must be taken to the protein levels in such compositions.

For example, cachectic patients or persons suffering from end-stage AIDS, cancer or cancer treatment, severe pulmonary diseases like COPD (chronic obstructive pulmonary disease), tuberculosis and other infection diseases or persons that experienced severe surgery or trauma like burns can benefit from special liquid, low-volume nutrition. Furthermore, persons suffering from disorders in the throat or mouth such as oesophageal cancer or stomatitis and persons having problems with swallowing like dysphagic persons, require special liquid, low-volume nutrition. Also, persons just suffering from reduced appetite or loss of taste, will benefit from low-volume, preferably liquid, food.

Other examples of patients that require special liquid, low-volume nutrition can be elderly persons, in particular frail elderly and elderly at risk of becoming frail. In this regard, although an elderly person's energy needs may be reduced, their ability to consume products may also be diminished. For example, they may have difficulty consuming a product due to, e.g., swallowing difficulties, or due the too large amount of product they need to consume to meet the daily intake of nutrients. Hence, compliance is not optimal, and often, the intake is suboptimal, leading to suboptimal nourishment, and in the end, to malnutrition.

The aforementioned groups of patients may be extremely sensitive to food consistency and to the organoleptic properties of the product such as, for instance viscosity, mouth feel, taste, smell and colour. Also, patients such as cachectic patients, typically suffer from extreme weakness which often prevents them from sitting in a vertical position and from drinking food from a carton or even to suck it from a straw. These patients benefit well from liquid low-volume enteral compositions with a high content of nutrients, in particular proteins.

Technical difficulties exist in producing a stable, in particular a shelf-stable nutritional liquid composition having a high content of proteins. Increasing protein levels in nutritional liquid compositions for enteral use may increase the overall viscosity of the composition. This can make the liquid nutritional composition difficult to consume or administer, and can also diminish the taste of the nutritional composition. These phenomena often follow non-linear kinetics and the problems quickly increase in magnitude when the concentration of ingredients is increased above 28 weight %. Therefore, many of the commercial shelf-stable liquid products that are currently available have intact protein levels below about 9 g per 100 ml of product.

A known method to increase the protein content to a higher level without imparting viscosity is replacing part of the total protein by peptides or free amino acids. However, this seriously decreases taste appreciation and therefore voluntary intake of the nutritional composition by the patient group. Another solution is offered by replacing milk proteins by vegetable proteins which decreases the viscosity of the obtained nutritional composition. However, liquid nutritional compositions that comprise considerable amounts of vegetable proteins are often perceived as having a disagreeable taste. Furthermore, vegetable proteins are not as heat-stable as caseinate or micellar casein making it a less preferred choice of proteins.

On the other hand, many concentrates like condensed milks suffer from an incomplete nutrient profile, too high lactose levels, sticky mouth-feel, high viscosity, extreme sweetness and a high osmotic value, which is not appreciated by the consumer and increases rapidly feelings of fullness and satiety after consumption. This makes that the urge to consume more volume deteriorates rapidly once a small amount of the product has been consumed.

WO 02/098242 A1 discloses a calorically dense liquid oral supplement (2.25 kcal/ml) based on a (60:40) soy protein isolate/caseinate mixture with a protein level of 9 g/100 ml. This composition is prepared by first hydrating soy protein into water after which casein can be added to the protein slurry. This slurry is pH adjusted, subjected to a heat-treatment followed by inclusion of a fat source. As a last step, a solution of carbohydrates is added to this mixture followed by pH adjustment and thermal processing.

U.S. Pat. No. 5,683,984, and the corresponding EP patent 0 686 396 B1, teach to prepare a liquid micellar protein composition to which digestible carbohydrates and various minerals are added, followed by mixing and dissolving of these ingredients.

EP 2 363 028 A1 discloses a method of producing a liquid nutritional supplement, the method comprising: providing a mixture including water and a protein source including milk protein isolate and/or canola plant proteins; subjecting the mixture to direct steam injection (DSI); and homogenizing the mixture. Any further ingredients, such as carbohydrates, fats/emulsifiers vitamins and minerals, are added to a protein slurry mixture or added without premixing into a dry blend.

WO 2008/041219 discloses a dry milk protein composition comprising at least 12.5 wt % of a slow digesting milk protein, in particular micellar casein. The milk protein composition is first provided in the form of a powder, which is then used into in beverages, desserts, confectionary, baked or dairy products, without pasteurisation or sterilisation. A liquid high protein shake containing 11.4% Ultra Bio-M™ (about 8 weight % of protein) is exemplified.

WO 2009072886 A1 describes a method suitable for producing a liquid enteral nutritional composition with high micellar casein content comprising a step wherein a protein solution, in which all or a major part of said protein comprises micellar casein, is subjected to an evaporation step. The method described therein starts by dissolving powderous micellar casein in water. The protein ingredients are dissolved in an excess of water, typically 150 weight % or volume % of what is required for the final composition. It is expressly mentioned that without this excess of water, the protein solution is too thick to be processed any further, including homogenisation and pasteurisation.

SUMMARY OF THE INVENTION

The problem underlying the present invention is to provide a shelf-stable liquid enteral composition for providing nutrition, either as a supplement, or as a complete nutrition, comprising a high content of an intact protein, as major protein source, in the smallest volume of liquid, and which supports nutrition and well-being in the different patient groups mentioned above, in particular to an elderly person or an ill patient.

The present invention relates in general to a shelf-stable liquid enteral composition for providing nutrition, either as a supplement, or as a complete nutrition, comprising a high amount of native micellar casein.

As discussed above, in WO2009/072886 A1 a method is described wherein a liquid enteral nutritional composition is manufactured that has a high micellar casein content. That method requires that the micellar casein is first dissolved in a relatively large body of water, which is subsequently subjected to an evaporation step to concentrate the protein fraction and other nutrients with the aim of ending up with a liquid enteral nutritional composition with, inter alia, high micellar casein content. That method, although providing proof of principle for obtaining the nutritional compositions as claimed and disclosed therein, is quite costly since it involves evaporation of relatively large amounts of water.

Therefore, the inventors of the present invention have sought for an alternative method of providing a liquid nutritional composition suitable for enteral use, which has a high protein content and is designed to meet the nutritional needs of persons in need thereof. The composition should have a high amount of protein per unit volume while having a sufficiently low viscosity to allow the composition to be easily consumed orally or be administered by tube. Furthermore, the nutritional composition preferably has a caloric content of at least 1.6 kcal/ml.

The method of the present invention is aimed at solving, at least partially, these problems in providing a more cost-effective method that at least circumvents the evaporation step disclosed in WO2009/072886 A1.

The present inventors surprisingly found that prior to adding water, preparing a dry blend, e.g. by pre-mixing micellar casein and digestible carbohydrates both in dry form, allowed the use of less water to obtain a solution of micellar casein and digestible carbohydrates with appropriate viscosity for further processing, compared to the amount of water needed when micellar casein is dissolved as single ingredient.

The present invention provides a liquid nutritional composition suitable for enteral use, a method of preparing the liquid composition and an aqueous intermediate product that is designed to be used in the preparation method. The liquid enteral nutritional composition obtainable by the method has a high protein content and is designed to meet the nutritional needs of persons in need thereof, in particular elderly and patients with certain disease states. The composition provides a high amount of protein per unit volume while having a sufficiently low viscosity to allow the composition to be easily consumed orally or be administered by tube. In addition, the taste of the composition is not diminished or adversely affected.

To this end, in a first aspect of the present invention, a method of producing a liquid nutritional composition for enteral use is provided, which method makes use of the technology and ingredients as detailed in the appended claims.

In a second aspect, the present invention relates to a liquid nutritional composition obtainable by the method of the present invention.

In a third aspect, the present invention relates to a dry blend comprising powderous micellar casein, a digestible carbohydrate and optionally caseinate, the dry blend being adapted for use in the method of the present invention.

DETAILED DESCRIPTION OF THE INVENTION

Method of Producing a Liquid Nutritional Composition

The present invention thus relates to a method of producing a liquid nutritional composition for enteral use comprising a protein fraction, a carbohydrate fraction and a fat fraction, the method comprising the steps of:

a) mixing a dry blend of micellar casein and digestible carbohydrate with water having a temperature of between about 30° C. and about 90° C., b) dissolving the blend of micellar casein and digestible carbohydrate in the water, c) de-aerating the composition of step b) preferably until the amount of air in the composition reaches a value below at least 20% (v/v), d) mixing dietary fat into the composition of step c), and e) heat-treating, preferably by heat-sterilization or pasteurization, the nutritional composition obtained in step d), optionally followed by aseptically filling of the heat-treated composition in a suitable container.

In a preferred embodiment, the dry blend comprises or consists of a combination of micellar casein (with and/or without caseinate) and a digestible carbohydrate. Preferably, the weight ratio of micellar casein to the digestible carbohydrate present in the dry blend lies between 9:1 and 1:9 more preferably between 4:1 to 1:4, even more preferably between 3:1 and 1:3, even more preferably between 2:1 and 1:2, most preferably around 1:1.

In a preferred embodiment, the dry blend is mixed with water in a weight ratio of about 4:1 to about 1:4, more preferably 3:1 to 1:3, even more preferably 2:1 to 1:2, most preferably between 3:2 and 1:2 or 1:1 and 1:2. In an alternative embodiment, a total amount of between 200 and 900 g of the dry blend is added per liter water, more preferably between 300 and 800 g per liter water, even more preferably between 400 and 700 g per liter water, most preferably between 450 and 600 or 500 and 600 g per liter water.

In one embodiment, the dry blend of step a) comprises micellar casein in an amount of between 10 and 90 wt %, preferably 20 and 80 wt %, more preferably between 25 and 75 wt %, even more preferably between 40 and 60 wt %. The preferred micellar casein source is Micellar Casein Isolate (MCI) as it contains high levels of micellar casein and low levels of other constituents such as whey protein and lactose. However, within the context of this invention, it is understood that micellar casein may also be provided by other milk protein sources, such as sources in which the natural 80:20 ratio of casein to whey is essentially preserved, such as Milk Protein Concentrate (MPC) and/or Milk Protein Isolate (MPI).

In one embodiment, the dry blend comprises a combination of micellar casein and caseinate(s) in an amount of between 20 and 80 wt %, preferably between 30 and 70 wt %, more preferably between 40 and 60 wt %. The weight ratio of micellar casein to caseinate in this combination preferably lies between 10:1 and 2:1, more preferably between 8:1 and 3:1, even more preferably between 7:1 and 4:1, most preferably between 6:1 and 4:1.

In one embodiment, the dry blend of step a) comprises micellar casein in an amount of between 10 and 90 wt %, preferably between 20 and 80 En %, more preferably between 25 and 75 En %, even more preferably between 40 and 60 En %. In one embodiment, the dry blend comprises a combination of micellar casein and caseinate(s) in an amount of between 20 and 80 En %, preferably between 30 and 70 En %, more preferably between 40 and 60 En %.

In one embodiment, the dry blend of step a) comprises a digestible carbohydrate in an amount of between 10 and 90 wt %, preferably between 20 and 80 wt %, more preferably between 25 and 75 wt %, even more preferably between 35 and 60 wt %. Preferably, the digestible carbohydrate comprises or consists of a maltodextrin and/or sucrose. More preferably, the total amount of maltodextrin and/or sucrose accounts for an amount of between 10 and 90 wt %, preferably between 20 and 80 wt %, more preferably between 25 and 75 wt %, or 35 to 60 wt % of the total dry blend.

In one embodiment, the dry blend of step a) comprises a digestible carbohydrate in an amount of between 10 and 90 wt %, preferably between 20 and 80 En %, more preferably between 25 and 75 En %, more preferably between 35 and 60 En %. Preferably, the digestible carbohydrate comprises or consists of a maltodextrin and/or sucrose. More preferably, the total amount of maltodextrin and/or sucrose accounts for an amount of between 10 and 90 wt %, preferably between 20 and 80 En %, more preferably between 25 and 75 wt %, even more preferably between 35 and 60 En % of the total dry blend.

In one embodiment, however, the digestible carbohydrate is selected from the group consisting of a monosaccharide, a disaccharide, an oligosaccharide and any combination thereof. Preferably, the digestible carbohydrate comprises a monosaccharide selected from glucose, fructose, galactose or any combination thereof. Preferably, the disaccharide is selected from sucrose, lactose, maltose and any combination thereof. Preferably, the oligosaccharide is selected form starch and maltodextrin. Preferably, the oligosaccharide has a DP (degree of polymerization) of between 3 and 30. More preferably, the digestible carbohydrate is a maltodextrin, preferably a maltodextrin having a Dextrose Equivalence (DE) of between 5 and 80. In the art, maltodextrin having a DE of 20 or higher is also known as glucose syrup with a DE of 47.

In one embodiment, the weight ratio of micellar casein to digestible carbohydrate in the dry blend of step a) lies between 4:1 and 1:4, preferably 3:1 and 1:3, more preferably between 2:1 and 1:2, most preferably between 3:2 and 2:3.

In one embodiment, the dry blend of step a) further comprises caseinate, preferably selected from sodium caseinate, potassium caseinate, calcium caseinate, magnesium caseinate and any combination thereof. In a preferred embodiment, the caseinate is present in a total amount in the dry blend of step a) of between 1 and 20 wt %, preferably between 5 and 15 wt %.

In one embodiment, the dry blend of step a) further comprises whey protein, preferably in an amount of 18 wt % or less, based on the total amount of proteins of the dry blend. Preferably, this amount of whey in the dry blend is less than 15 wt %, or less than 10 or less than 8 or less than 5 wt % of the complete protein fraction. As MCI contains low whey protein levels, MCI is the preferred source of micellar casein.

In one embodiment, the dry blend of step a) does not contain significant vegetable protein levels, in particular soy, pea and/or canola protein. Preferably, the dry blend comprises less than 50 wt % vegetable protein, more preferably less than 30 wt %, 10 wt %, or even less than 5 wt %. The presence of high levels of vegetable protein is not desired in view of the off-tastes that are often related to these protein sources. Furthermore, since the combination of micellar casein and digestible carbohydrates is sufficient to allow the production of a liquid, nutritional composition with low viscosity according to the present invention, the presence of these protein sources in the dry blend is not required.

The dry blend of the present invention may further comprise, in a preferred embodiment, silicon dioxide particles to improve flowability properties of the dry blend. In a preferred embodiment, the dry blend comprises up to 5 wt % silicon dioxide particles, more preferably up to 4 wt % or 3 wt %. Alternatively, the silicon dioxide particles may be added at a different stage of the method, such as to the de-aerated composition as obtained after step c) and before adding fats in step d).

Preferably, the mixing of step a) of the dry blend of micellar casein and a digestible carbohydrate takes place with water having a temperature of between about 30° C. and about 90° C. More preferably, the temperature lies between about 40° C. and about 80° C., most preferably the temperature lies between about 50° C. and about 75° C.

In another preferred embodiment, the dissolving of the components of the dry blend of step b) takes place for a suitable amount of time. Preferably, this takes between 30 minutes and 6 hours, more preferably between 1 and 4 hours and may involve stirring of the composition at a suitable speed.

The de-aeration of step c), wherein the composition comprises micellar casein and the digestible carbohydrate, preferably takes place prior to the adding and mixing of any oils and/or fats in the composition. Preferably, it also takes place prior to any heat treatment step, such as pasteurization or sterilization. De-aeration can be effectuated by any means known to the person skilled in the art. De-aeration can be effectuated actively, for example by modifying pressure and/or atmosphere under which the composition comprising the micellar casein and the digestible carbohydrate is kept or in a de-aerator device. De-aeration can also be effectuated passivley, for example by leaving the composition comprising the micellar casein and the digestible carbohydrate standing allowing air to escape form the composition until a preferred maximum amount of air in the composition is reached. Preferably, de-aeration involves gentle stirring of the aqueous composition for a suitable amount of time which preferably is up to 4 hours. During this period of time, the composition is maintained at a temperature of between 30 and 90° C. Thus preferably, de-aeration of step c) takes place for up to 4 hours, more preferably for 1 to 3 hours, more preferably for around 2 hours.

Additionally or alternatively, the composition obtained from step b) is de-aerated in step c) until the amount of air in the composition reaches a value of below 20% (v/v), preferably below 15% (v/v), more preferably below 10% (v/v). From the point of view that the complete method of processing is as short as possible, a value of already below 20% (v/v) is preferred.

It lies well within the capabilities of the skilled person to determine the amount of air present in a sample of the composition which is taken at any time point during the herein mentioned de-aeration step. For instance, by using a cylindrical measuring glass with volume indication a sample with a volume of 1 L can be taken, which, under the influence of gravitational force, forms a stable interface between the air that was present in the sample as taken and the de-aerated composition under investigation. When the interface is stabilized, meaning it does not change anymore over a period of 10 minutes, the volume of air present above the interface is a measure of the amount of air (in volume percentage; % v/v) that was present in the analysed sample. When the amount of air has been sufficiently reduced to the indicated volume percentages, the dietary fats are added to the composition.

Step d) of the method of the present invention comprises the mixing of a fat or fats into the composition obtainable after step c). Step d) preferably commences when the composition has been sufficiently de-aerated, meaning the amount of air in the composition has reached a value of below 20% (v/v).

The term "fat or fats" as mentioned herein is interchangeable with the term dietary fat(s) and includes animal fats and oils. It includes vegetable oils (in particular canola oil, rape seed oil, sunflower oil and the like) and fish oils (including, but not limited to, omega-3 comprising oils). Preferably, the fat of step d) consists of or comprises a dietary fat or oil that is liquid at room temperature, such as a vegetable oil, more preferably canola oil.

Thus, the fat(s) as added to the composition in step d) preferably comprise dietary fat(s) as meant herein. Preferably, the amount of fat, expressed as the caloric energy percentage (En %) of the indicated composition, added in step d) lies between 15 and 45 En % fat preferably between 20 and 42 En %, more preferably between 28 and 40 En %, most preferably between 32 and 38 En % of the composition obtained after the addition in step d) or of the heat-treated liquid composition obtained after step e).

In an alternatively preferred embodiment, the fats as added to the composition in step d) comprise dietary fats as meant herein, and are added in an amount of between 10 and 400 g per liter water as used in step a). More preferably, this amount lies between 50 and 300 g per liter, more preferably this amount lies between 100 and 250 g per liter, most preferably this amount lies between 125 and 225 g per liter.

In one embodiment, one or more further ingredients selected from the group consisting of minerals, lecithin, vitamins and/or flavours, is/are mixed with the water. In all instances, these further ingredients are preferably added to the composition before the fats are added or at least before the composition is subjected to the heat-treatment of step e). When lecithin is added to the composition, it is preferably comprised by the fat fraction and added simultaneously with said fats in step d) of the method of the invention.

Further ingredients, such as minerals, flavourings and/or vitamins are added to the composition in either dry form or dissolved in water. When these further ingredients are added as a solution in water, the composition is diluted to a limited extent by the water comprising the suitable minerals, flavourings and vitamins. In a preferred embodiment, minerals, vitamins and/or flavourings are added after dissolving of the dry blend in step b) or after de-aerating step c) or after adding and mixing of the fats in step d) in amount of water which is less than 100 ml per liter water used in step a), more preferably less than 75 ml, most preferably less than 50 ml per liter water used in step a).

In one embodiment, the heat-treatment of step e) is a pasteurization step and vitamins and/or flavours are added to the pasteurized composition according to this embodiment, after which a second heat-treatment step, preferably a heat-sterilization step, is included.

Although it is essential that the dry blend comprises micellar casein and digestible carbohydrate, it is not critical that all digestible carbohydrates which are included in the liquid nutritional composition are added thereto via the dry blend of the present invention as a vehicle. Thus, in order to obtain an increased level of such carbohydrates in the (end-) product obtainable by the method of the invention, it is possible to add this macronutrient independently from the dry blend.

Thus, in an alternative embodiment, a second digestible carbohydrate, which is the same or is different from the digestible carbohydrate comprised in the dry blend, is added independently from the dry blend in the method of the invention to obtain the liquid nutritional composition. Preferably, this second digestible carbohydrate, such as sucrose, is added prior to the mixing of the dry blend with the water in step a). However, this part of the digestible carbohydrates can also be added simultaneously, using a different stream, or subsequently to the mixing of the dry blend in the water in step a).

Preferably, the amount of digestible carbohydrates as present in the dry blend relates to the amount of the second carbohydrate in a weight ratio of between 10:1 and 1:10, more preferably in a weight ratio of between 7:1 and 1:7, even more preferably in a ratio of 5:1 to 1:5, or between 3:1 and 1:3, or between 2:1 and 1:2. Alternatively, the second digestible carbohydrate is added to the composition in an amount of between 10 and 600 g per liter water as used in step a). Preferably, this amount lies between 50 and 500 g per liter, more preferably between 100 and 400 g per liter, most preferably between 150 and 300 g per liter. The second digestible carbohydrate is preferably maltodextrin and/or sucrose.

In one embodiment, the pH of the composition, prior to the heat-treatment of step e) and preferably after dissolving step b), lies between pH 6.0 and 7.2, more preferably between 6.4 and 7.0 or 6.4 and 6.8. In a preferred embodiment, the pH of the composition lies in the indicated range after dissolving the dry blend, without the need for including a pH adjustment step. However, if a particular pH is preferred to obtain a particular ready-to-use liquid composition, the pH can be adjusted using an organic acid or suitable organic base to reach a particular pH value in the range of 6.0 to 7.2.

More preferably, the pH of the composition is kept between pH 6.0 and 7.2 at each step throughout the method of the invention, in particular throughout steps a-d). Adjusting the pH after a heat-sterilization is not desired from the point of view that microbiological activity may be introduced in the sterilized composition.

In one embodiment, the heat treatment step comprises a heat-sterilization or pasteurization step. The heat-sterilization step can be retort sterilization, UHT treatment or any other suitable heat-sterilization steps. Typical retort sterilization conditions include low-end temperatures of about 110° C. for longer time periods, such as 15-20 minutes, or more high-end temperatures, typically about 130° C. to 135° C., for shorter time periods, such as 4-5 minutes. UHT treatment conditions typically include 120° C. for 3-4 minutes or when opting for higher temperatures, such as 150° C., shorter incubation times can be used, such as 1-3 seconds.

In a preferred embodiment, the composition is homogenized before or after the composition is heat-treated in step e). More preferably, the composition is homogenized after the fats are added to the composition in step c).

Optionally, the heat-treated liquid nutritional composition (suitable as a nutritional composition for enteral use) is aseptically filled into a container, preferably a plastic bottle. In order to prevent microbiological spoilage of the contents of the bottle, it is preferably air-tightly sealed. Both the heat-treated liquid nutritional composition and the aseptically filled liquid enteral nutritional composition are regarded herein as products directly obtainable by the method of the invention and as such encompassed by the scope of the present invention.

In one embodiment, the method of the invention results in the provision of a shelf-stable liquid enteral nutritional composition. Herein, shelf-stable is defined as having a stability of more than 6 months on the shelf under normal storage conditions, i.e. at an ambient temperature of between 18 and 25° C. at a standard atmospheric pressure.

In a further aspect, the invention concerns a liquid nutritional composition obtainable by the method according to the invention, wherein the liquid nutritional composition comprises micellar casein, digestible carbohydrate and dietary fat. Preferably the weight ratio of micellar casein to digestible carbohydrate lies between 9:1 and 1:9, preferably between 4:1 and 1:4, more preferably between 3:1 and 1:3, even more preferably between 2:1 and 1:2, most preferably around 1:1.

In a preferred embodiment, the nutritional composition obtainable by the method of the invention comprises 8 to 20 g/100 ml micellar casein, 10 to 40 g/100 ml digestible carbohydrates, 5 to 15 g/100 ml dietary fat and has an energy density of at least 1.6 kcal/ml, and optionally between 0.1 and 4 g/100 ml caseinate.

In a preferred embodiment, the dry blend used in step a) comprises micellar casein, caseinate and a digestible carbohydrate selected from sucrose and maltodextrin and a combination thereof. More preferably, the dry blend also comprises whey protein. Most preferably, the micellar casein is present in an amount of 40 to 60 wt % of the total amount of the dry blend, caseinate is present in an amount of between 6 and 14 wt %, a digestible carbohydrate selected from sucrose and/or maltodextrin is present in an amount of between 30 to 50 wt % and whey is present in an amount of between 2 and 10 wt %.

Dry Blend Designed for Use in the Method of the Invention

In yet another aspect, the present invention relates to a dry blend comprising micellar casein, digestible carbohydrate and optionally caseinate. The dry blend is characterized by the embodiments as mentioned under the method of the invention and has, in a further preferred embodiment, a moisture content of between 1 and 10 wt %, preferably between 2 and 7 wt %, more preferably between 3 and 5 wt %, most preferably between 2 and 4 wt % based on total weight of the dry blend. In one embodiment, the dry blend according to the present invention comprises at least 10 wt. % micellar casein, at least 10 wt. % digestible carbohydrate and optionally caseinate, preferably at least 20 wt. % micellar casein, at least 20 wt. % digestible carbohydrate and optionally caseinate, more preferably at least 25 wt. % micellar casein, at least 25 wt. % digestible carbohydrate and optionally caseinate, more preferably at least 35 wt. % micellar casein, at least 35 wt. % digestible carbohydrate and optionally caseinate.

In particular in the dry blend according to the invention the weight ratio of micellar casein to digestible carbohydrate lies between 9:1 and 1:9, preferably between 4:1 and 1:4, more preferably between 3:1 and 1:3, even more preferably between 2:1 and 1:2, most preferably around 1:1.

In one embodiment, the dry blend according to the invention comprises caseinate, preferably selected from sodium caseinate, potassium caseinate, calcium caseinate, magnesium caseinate and any combination thereof, in an amount of between 1 and 20 wt %, preferably between 5 and 15 wt % of the dry blend.

In one embodiment, the dry blend according to the invention further comprises whey protein, preferably in an amount of 18 wt % or less, based on the total amount of protein of the dry blend.

In one embodiment, the dry blend comprises micellar casein in an amount of between 10 and 90 wt %, preferably between 20 and 80 wt %, more preferably between 25 and 75 wt %, most preferably between 40 and 60 wt %.

In another embodiment, the dry blend comprises digestible carbohydrate in an amount of between 10 and 90 wt %, more preferably between 20 and 80 wt %, even more preferably between 25 and 75 wt %, most preferably between 35 and 60 wt %.

In one embodiment, the digestible carbohydrate in the dry blend according to the invention is selected from the group consisting of monosaccharide, disaccharide, oligosaccharide and any combination thereof, preferably the digestible carbohydrate comprises maltodextrin and/or sucrose.

In one embodiment, the dry blend according to the invention further comprises whey protein in an amount of 18 wt % or less, based on the total amount of protein of the dry blend and the weight ratio of micellar casein to digestible carbohydrate lies between 3:1 and 1:3.

DEFINITIONS AND COMPONENTS AS USED IN ALL ASPECTS OF THE PRESENT INVENTION

Micellar casein refers to casein in the form of micelles and is preferably understood herein as resembling this milk protein as naturally occurring in cow's milk. It is a high quality milk protein and naturally occurring in milk in a concentration of about 2.6 g/100 ml (Dairy Science and Technology, Walstra et al., CRC Press, 2006). It is concentrated by a process that does not, or does not substantially denature the casein proteins and it is marketed as Micellar Casein Isolate (MCI). Fresh skim milk is subjected to a microfiltration process, in much the same process used to concentrate whey protein, to produce a pure, substantially undenatured milk protein meaning it retains its micellar structure. The resulting material contains between 90% and 95%, preferably more than 95% by weight of micellar casein, the rest mainly being whey protein and other non-protein nitrogen and other constituents, such as lactose and inorganic salts, in particular calcium phosphate. The casein micelles generally have a hydrodynamic radius of 40 to 400 nm, a molecular weight of $10^6$ to $10^9$ Dalton and a calcium:phosphorous weight ratio of 1.4 to 2.4. It has an intrinsic low viscosity and a liquid composition comprising high MCI levels is therefore easy to drink.

Preferably, the MPC as meant herein comprises high protein levels, such as between at least 60, 70, 80, 85, 90 and 95 wt % of the MPC.

Preferably, the MPI as meant herein also comprises high protein levels, such as between at least 60, 70, 80 and 95 wt % of the MPI, most preferably between 85 and 95 wt % or between 90 and 95 wt % of the MPI.

In one embodiment, MPI and/or MPC is/are used in the dry blend of step a), preferably in combination with MCI to reach high micellar casein levels and to lower the amount of whey to below the 80:20 naturally occurring ratio. Hence, in a preferred embodiment, the dry blend comprises micellar casein which consists of MCI, or the dry blend comprises micellar casein which consists of a combination of MCI with MPC or a combination of MCI with MPI or consists of a combination of MCI, MPC and MPI.

In contrast, caseinate, as it is used in the context of this invention refers to the curd form of casein, meaning herein it has lost its micellar structure. It is bound to a metal, such as sodium, calcium, potassium and magnesium. Not limiting examples include calcium caseinate and sodium caseinate.

Within the context of this invention, it is understood that micellar casein may also be provided by other milk protein sources, such as, for instance, sources which essentially preserve the natural 80:20 ratio of casein to whey, such as Milk Protein Concentrate (MPC), which is a powder product usually prepared by ultrafiltration with an average protein content of about 80 weight %, Milk Protein Isolate (MPI), a powder product usually prepared by precipitation with an average protein content of more than 85 weight %, and skimmed concentrated milk.

Fat and/or oils as meant herein are dietary fat(s) and include animal fats and oils. It includes vegetable oils (preferably canola oil, rape seed oil, sunflower oil and the like) and fish oils (including, but not limited to, omega-3 comprising oils such as eicosapentaenoic acid (EPA), alpha-linolenic acid (ALA), docosapentaenoic acid (DPA), and docosahexaenoic acid (DHA). Preferably, the fat of step d) consists of or comprises vegetable oil, more preferably it consists of or comprises canola oil.

In the context of this invention, the term "at least" also includes the starting point of the open range. For example, an amount of "at least 95 weight %" means any amount equal to 95 weight % or above.

In the context of this invention, enteral means orally or by tube.

In the context of this invention, the % of total energy is also abbreviated as En %; En % is thus short for energy percentage and represents the relative amount that a constituent contributes to the total caloric value of the composition.

In the context of this invention, the term "about" indicates that a certain deviation is allowed from a cited value, the magnitude thereof being determined by inter alia the accuracy of the determination method. Typically, such a deviation is 10%.

In the context of this invention, all proteins mentioned herein are intact, which is equivalent to non-hydrolysed, meaning that the proteins have not, or not substantially, been subjected to an hydrolysis process. However, minor amounts of hydrolysed proteins may be present in the source of non-hydrolysed proteins, or may be added to the formulation, such as additional amino acids, such as for example branched chain amino acids, for example leucine, isoleucine, valine and the like. In this context, "minor" should be understood as an amount of about 10 weight % or less, based on total protein.

In the context of this invention, it is understood that "liquid" refers to a water-based composition, such as a solution or a suspension, having a viscosity of 200 mPa·s or less, as determined at 20° C. in a rotational rheometer at a shear rate of 100 s$^{-1}$. A value of about 200 mPa·s is herewith defined as an empirical upper viscosity limit, above which a liquid system has an unacceptably high viscosity to be readily drinkable. It is preferred to provide a composition having a viscosity of less than 200 mPa·s, more preferably 150 mPa·s or less.

The invention will now be further elucidated by describing the preferred embodiments of the present invention in more detail.

EXAMPLES

Example 1

Commercially available sources of micellar casein isolate, Na-caseinate, K-caseinate, maltodextrin 19 DE and sugar were dissolved in two trials (Trial 1-1 and Trial 1-2) on pilot plant scale using a vessel with a size of 20 liters. The only difference in the two trials was that the micellar casein was added either as part of a blend in powder form with maltodextrin 19 DE and sodium caseinate, potassium caseinate (Trial 1-1) or as a single ingredient (Trial 1-2). The micellar casein isolate source contained around 3.5 g lactose per 100 g and around 7 g whey protein per 100 g micellar casein isolate. The dry blend consisted of 5.8 kg MCI, 4.4 kg maltodextrin 19 DE, 0.54 kg glucose syrup (Glucidex 47 DE), 0.4 kg sodium caseinate and 0.79 kg potassium caseinate.

In Trial 1-1, 4.81 kg sucrose was first dissolved in 20.8 L demineralised water with a temperature of 60° C. by gentle stirring. Subsequently, the indicated blend of micellar casein isolate, maltodextrin 19 DE, sodium caseinate and potassium caseinate was added to a final protein concentration of 14.9% w/w and a final dry matter of 41.2% w/w.

In Trial 1-2, the same ingredients were mixed with demineralised water of 60° C. under the same conditions, with the only exception that the micellar casein isolate was not part of the dry blend and was added to the water after the sucrose was added, but before the blend of in this case only maltodextrin and the indicated caseinates was added.

Viscosity was determined after dissolving of the thus far added ingredients using a temperature-controlled rheometer at 20° C., with a cone plate geometry at a shear rate of 100/s. It was noticed that the viscosity of the product in which the micellar casein isolate was part of the powder blend (Trial 1-1) was at least 25 to 30% lower compared to the viscosity of the product in which the micellar casein isolate was added as a separate ingredient (Trial 1-2). The pH of the aqueous compositions was between pH 6.5 and pH 6.75 in all cases.

After de-aerating for 2-4 hours, canola oil was added to both aqueous compositions, followed by a pasteurization step, addition of vitamins and flavours and a final heat-sterilization step.

The advantage of dissolving micellar casein isolate as part of the indicated dry blend is the lower viscosity which is observed during the entire dissolving process. Sucrose could be added before or after addition of the indicated dry blend without significantly affecting the outcome of such trials. Also when no sucrose was added, the use of the dry blend resulted in a product with a lower viscosity than when micellar casein and maltodextrin were not pre-blended. In all such cases, the use of the indicated dry blend resulted in a lower viscosity compared to addition of micellar casein without being blended with maltodextrin beforehand.

The inclusion of either sodium caseinate, potassium caseinate or calcium caseinate in similar trials did not significantly affect the outcome of the trials.

Example 2

Commercially available sources of micellar casein isolate, caseinate, maltodextrin 19 DE and sugar were dissolved in two trials representing an industrial scale process using a vessel with a content of 10.000 liters (Table 1, Trials 2-1 and 2-2). The only difference in the two preparation methods was that the micellar casein was independently added as a single ingredient (Trial 2-1) as opposed to being added as part of a dry blend with maltodextrin 19 DE (Trial 2-2). Besides these adaptations in the order of additions and the up-scaling of the experiment to a larger volume, no significant adaptations in the use of ingredients were made and weight ratios of the used ingredients were kept.

Dissolving in both trials was started by dissolving sucrose in tap water with a temperature of 65° C. by gentle stirring. In Trial 2-1 this was followed by dissolving of the maltodextrin 19 DE. After the maltodextrin 19 DE, the micellar casein isolate was dissolved and finally the caseinates were added. In Trial 2-2, dissolving of sucrose was followed by addition of a blend of maltodextrin 19 DE powder and micellar casein isolate powder, and after which the caseinates were added in a separate step.

Viscosities were determined during the mixing/dissolving process, i.e. after sucrose, MCI and maltodextrin 19 DE were added and a second time in the process samples were taken and the viscosity was determined using a temperature controlled rheometer at 20° C., with a cone plate geometry at a shear rate of 100/s. Each trial was tested twice and the results (average) are shown in table 1. As table 1 shows, after dissolving the carbohydrates and the micellar casein isolate, the viscosity of using single ingredients is five times higher compared to using the indicated blend. In this case, when the indicated ingredients were sequentially added and micellar casein isolate is not pre-blended it is not possible to dissolve the caseinates, so no final product was obtained.

TABLE 1

Preparation of an aqueous composition of sucrose, MCI, maltodextrin 19 DE and caseinate. Results as presented are an average of two independently conducted trials. After caseinates were added, it was not possible to dissolve the added ingredients of Trial 2-1 and not possible to determine the viscosity thereof.

| Added ingredient | Protein concentration in solution | Trial 2-1 | Trial 2-2 |
| --- | --- | --- | --- |
| T = 1: After additions of sucrose, maltodextrin 19 DE and MCI | 12.0% w/w | 1500 mPa · s | 300 mPa · s |
| T = 2: after addition of caseinate | 14.6% w/w | Too viscous | 950 mPa · s |
| T = 3: after de-aeration | | n.a. | 270 mPa · s | n.a. = not applicable.

The nutritional, aqueous composition of Trial 2-2 could be processed further according to the method of the invention into a heat-treated, liquid nutritional composition. Using a dry blend of micellar casein, maltodextrin and caseinate in similar weight ratios, good results were obtained as well under these conditions.

Furthermore, similar good results were obtained when sucrose was added after addition of the dry blend.

In both examples, standardized blends of minerals (i.e. magnesium hydrogen phosphate, di-potassium hydrogen phosphate, choline chloride) were added in standardized, equal total amounts during both trials, without significantly affecting the results thereof. Furthermore, the use of maltodextrin 19 DE or Glucidex 47 DE also did not affect the results in a significant manner.

Example 3

Dry blend consisting of 48.6 g MCI powder (Ingredia), 41.8 g granulated maltodextrin 19DE powder (Roquette), 6.2 g potassium caseinate (FrieslandCampina) and 3.3 g sodium caseinate (FrieslandCampina).

It should be understood that various changes and modifications to the presently preferred embodiments described herein will be apparent to those skilled in the art. Such changes and modifications may be made without departing from the spirit and scope of the invention and without diminishing its advantages. It is therefore intended that such changes and modifications are covered by the appended claims.

The invention claimed is:

1. A method of producing a liquid nutritional composition comprising a protein fraction, a carbohydrate fraction and a fat fraction, the method comprising, sequentially:
    (a) dissolving between 200 and 900 g of a dry blend comprising 20 and 80 wt % micellar casein and 20 and 80 wt % digestible carbohydrate per liter of water having a temperature of between 30° C. and 90° C.,
    (b) de-aerating the composition of step (a), reducing the viscosity of the composition,
    (c) mixing dietary fat into the composition of step (b),
    (d) heat-treating the composition of step (c), and optionally aseptically filling a suitable container with the heat-treated composition.

2. The method according to claim 1, wherein in the composition of step (a) is de-aerated to below 20% air (v/v).

3. The method according to claim 1, wherein the heat-treating is by heat-sterilization or pasteurization.

4. The method according to claim 1, wherein the dry blend comprises between 40 and 60 wt % micellar casein.

5. The method according to claim 1, wherein the dry blend comprises between 35 and 60 wt % digestible carbohydrate.

6. The method according to claim 1, wherein the digestible carbohydrate is selected from the group consisting of monosaccharide, disaccharide, oligosaccharide and any combination thereof.

7. The method according to claim 6, wherein the digestible carbohydrate comprises maltodextrin and/or sucrose.

8. The method according to claim 1, wherein between 400 and 700 g of the dry blend is added per liter water in step (a).

9. The method according to claim 1, wherein the dry blend further comprises between 1 and 20 wt % of caseinate.

10. The method according to claim 9, wherein the caseinate is selected from the group consisting of sodium caseinate, potassium caseinate, calcium caseinate and combinations thereof.

11. The method according to claim 1, wherein the dry blend further comprises whey protein.

12. The method according to claim 1, wherein an amount of between 10 and 400 g dietary fat is adder per liter water as used in step (a).

13. The method according to claim 1, wherein the dietary fat is selected from a dietary oil, a vegetable oil, a fish oil or an animal fat.

14. The method according to claim 13, wherein the vegetable oil is canola oil.

15. The method according to claim 1, wherein the pH of the composition obtained after any of steps (a) to (d) is between 6.0 and 7.2.

16. The method according to claim 15, wherein the pH of the composition obtained after any of steps (a) to (d) is between 6.4 and 6.8.

17. The method according to claim 1, wherein the dry blend comprises less than 18 wt. % whey protein.

* * * * *